(No Model.)

G. W. TERRY.

Calculator for Postage-Stamps.

No. 226,807.  Patented April 20, 1880.

WITNESSES:
Chas. Niota
C. Sedgwick

INVENTOR:
G. W. Terry
BY Munn & Co.
ATTORNEYS.

UNITED STATES PATENT OFFICE.

GEORGE W. TERRY, OF PRESCOTT, ARKANSAS.

CALCULATOR FOR POSTAGE-STAMPS.

SPECIFICATION forming part of Letters Patent No. 226,807, dated April 20, 1880.

Application filed March 5, 1880. (No model.)

*To all whom it may concern:*

Be it known that I, GEORGE W. TERRY, of Prescott, in the county of Nevada and State of Arkansas, have invented a new Improvement in Self-Calculating Registers for Postage-Stamps, of which the following is a specification.

Figure 1:
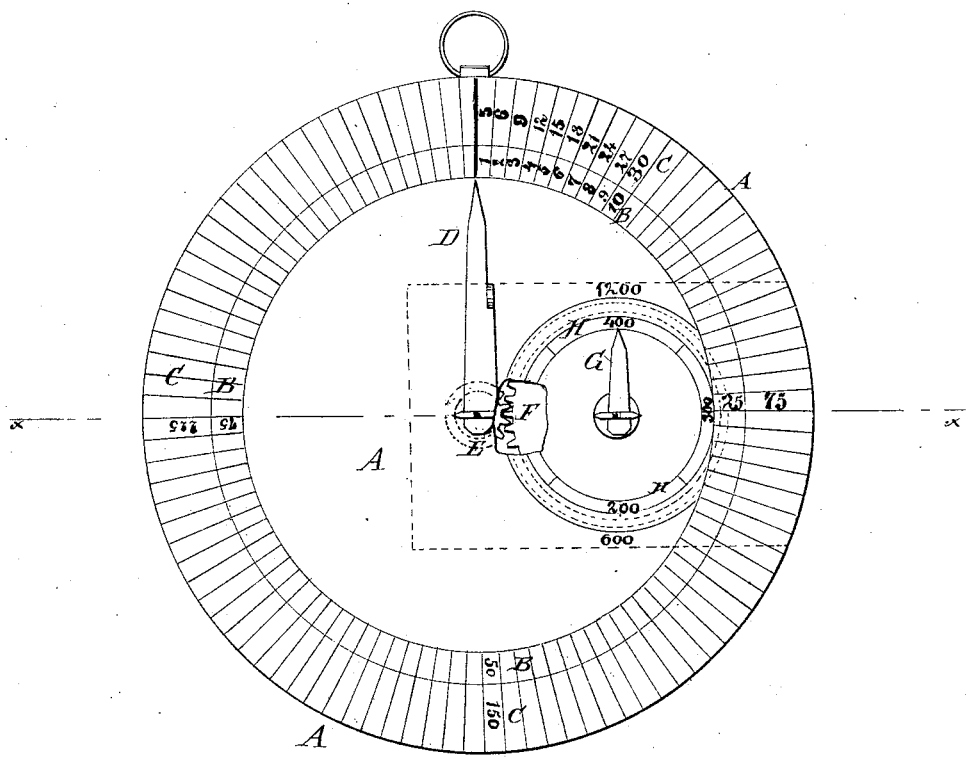
Figure 2:
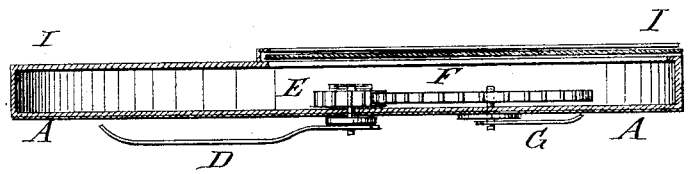

Figure 1 is a front elevation of the improvement. Fig. 2 is a cross-section taken through the line $x$ $x$, Fig. 1.

The object of this invention is to furnish self-calculating registers for postage-stamps designed for use in fourth-class post-offices, where a daily transcript of the number of stamps canceled has to be kept and forwarded to the department as a part of the quarterly returns, the use of which registers will save a great deal of time and labor in keeping the account.

The invention consists in the combination, with a plate having a scale of numerals from 1 to 100, in their natural order, a concentric scale of products obtained by multiplying the numbers by the value of a stamp, and a scale of hundreds, of two or more gear-wheels and indexes, whereby the number of stamps canceled each day and their money value can be registered, as will be hereinafter fully described.

A represents a circular plate, around the outer edge of which are formed two concentric rings, B C, of division-marks, having a hundred spaces in each ring or scale. In the spaces of the inner ring, B, are the successive numbers from 1 to 100, inclusive, and in the outer ring, C, are the numbers formed by multiplying the corresponding numbers of the inner scale by three. The inner scale thus shows the number of three-cent stamps cancelled, and the outer scale shows the money value of the said stamps.

To the center of the plate A is pivoted an index or pointer, D, the point of which sweeps around the inner scale, B.

To the pivot of the index D is attached a small gear-wheel, E, the teeth of which mesh into the teeth of the larger gear-wheel F, pivoted to the plate A. The pivot of the gear-wheel F carries an index or pointer, G, the point of which sweeps around a ring or scale, H, of division-marks, formed upon the plate A, and numbered in hundreds.

If the register is not required to record more than four hundred stamps the wheel F should have four times as many teeth as the wheel E; but I do not limit myself to that ratio, as the teeth of the wheel F may be any desired multiple of the teeth of the wheel E.

With this construction the index G will turn in the opposite direction from the index D; but it may be made to turn in the same direction by placing an intermediate gear-wheel between the wheels E F, which intermediate wheel should have the same number of teeth as the gear-wheel E.

The gear-wheels E F are placed upon the rear side of the plate A, and may be inclosed with a casing, I, or not, as may be desired.

In using the register the index D is moved forward as many spaces as equal the number of stamps canceled each time, and at the close of the day the number of stamps canceled and their money value are transcribed to the record, and the instrument is set at the zero-mark for the next day.

I am aware that self-calculating registers have been made. This I do not broadly claim; but

What I claim as new, and desire to secure by Letters Patent, is—

1. A self-calculating register for postage-stamps, constructed substantially as herein shown and described, consisting of the plate A, having scales B, C, and H, for showing the number of stamps and the value thereof, the gear-wheels E F, and the indexes D G, as set forth.

2. The combination, with the plate A, having scales B, C, and H, of the gear-wheels E F and the indexes D G, substantially as herein shown and described, whereby the number of stamps canceled and their money value are shown, as set forth.

GEORGE W. TERRY.

Witnesses:
R. E. ARNOLD,
T. M. MILAN.